United States Patent [19]

Sohaei et al.

[11] Patent Number: 5,430,558
[45] Date of Patent: Jul. 4, 1995

[54] PORTABLE OPTICAL SCANNER WITH INTEGRAL AUDIO RECORDER

[76] Inventors: Frank Sohaei, 7172 Tern Pl., Carlsbad, Calif. 92009; Fred Shahir, 634 Kendale La., Thousand Oaks, Calif. 91360

[21] Appl. No.: 954,167

[22] Filed: Sep. 29, 1992

[51] Int. Cl.⁶ .................................. G06K 7/10
[52] U.S. Cl. .................... 358/473; 358/335; 235/462; 235/470
[58] Field of Search ............... 358/473, 335, 474, 478; 235/462, 472, 467, 466, 472, 375, 470, 454; 250/368, 568, 205; 340/146.3 SY; 350/6, 96 B, 207, 285; 351/7, 16, 39; 372/24, 26, 98, 69, 15, 16

[56] References Cited

U.S. PATENT DOCUMENTS

| | | | |
|---|---|---|---|
| 3,784,818 | 1/1974 | Stoeckel et al. | 250/368 |
| 3,918,028 | 11/1975 | Humphrey et al. | 340/146.3 R |
| 3,918,029 | 11/1975 | Lemelson | 340/146.35 Y |
| 3,947,817 | 3/1976 | Requa | 340/146.3 MA |
| 4,026,638 | 5/1977 | Govignon | 350/6 |
| 4,135,791 | 1/1979 | Govignon | 350/6 |
| 4,523,235 | 6/1985 | Rajchman | 358/256 |
| 4,805,175 | 2/1989 | Knowles | 372/24 |
| 4,841,132 | 6/1989 | Kajitani et al. | 358/335 |
| 4,874,933 | 10/1989 | Sanner | 235/470 |
| 4,947,261 | 8/1990 | Ishikawa et al. | 358/473 |
| 4,970,379 | 11/1990 | Danstrom | 250/205 |
| 5,058,188 | 10/1991 | Yoneda | 382/59 |
| 5,063,508 | 11/1991 | Yamada et al. | 364/419 |
| 5,180,904 | 1/1993 | Shepard et al. | 235/470 |
| 5,231,293 | 7/1993 | Longacre, Jr. | 250/568 |
| 5,233,624 | 8/1993 | LaPlante et al. | 372/98 |
| 5,237,163 | 8/1993 | Collins, Jr. et al. | 235/472 |
| 5,250,790 | 10/1993 | Melitsky et al. | 235/462 |
| 5,272,324 | 12/1993 | Blevins | 235/462 |
| 5,301,243 | 4/1994 | Olschafskie et al. | 382/59 |

Primary Examiner—Paul Ip
Attorney, Agent, or Firm—Stetina Brunda & Buyan

[57] ABSTRACT

A portable optical scanner has a hand-held housing containing an optical sensor, a first memory for storing information representative of the output of the optical sensor, and a fiber optic image guide extending from the lower end of the housing to a position proximate the optical sensor for communicating an image being scanned from a scanned surface to the optical sensor. A lens disposed intermediate the optical sensor and image guide focuses the image upon the optical sensor. The fiber optic image guide has a lower surface formed at an angle of approximately 65 degrees to the longitudinal axis thereof such that the portable optical scanner is held at a conveniently comfortable angle during the scanning process to mitigate fatigue and improve the reliability of the scanning process. A microphone and second memory for storing information representative of the output of the microphone facilitates the recording of voice annotations to the image being scanned. A display in communication with the optical sensor displays the image being scanned to facilitate proper positioning of the fiber optic image guide during the scanning process. A standby switch and associated circuit permits the optical sensor to be operated in a low power consumption mode when the scanner is turned on but the fiber optic image guide is not in contact with a surface to be scanned. A scan window is adjustable in size to facilitate scanning of various type sizes. The quantity of memory allocated for scanning is proportional to the size of the scan window to optimize memory usage.

9 Claims, 1 Drawing Sheet

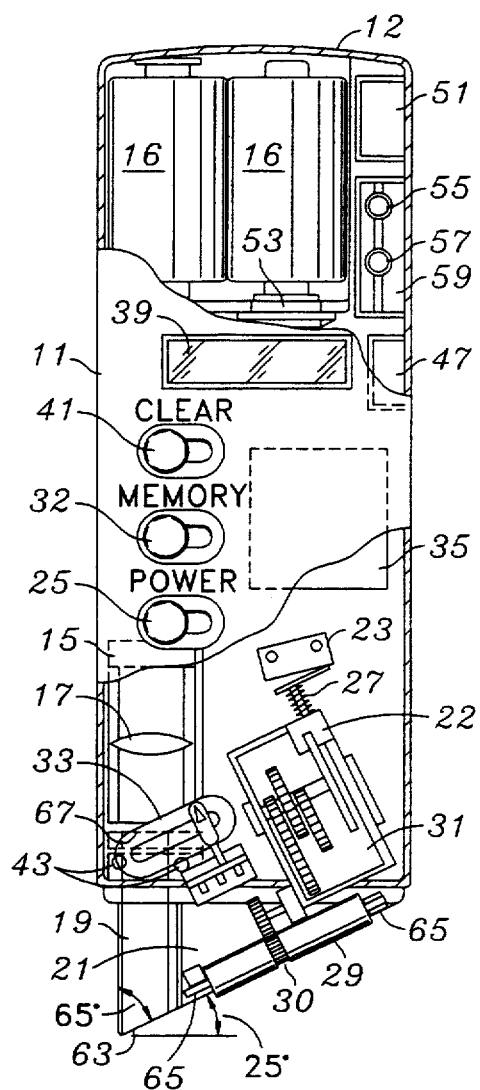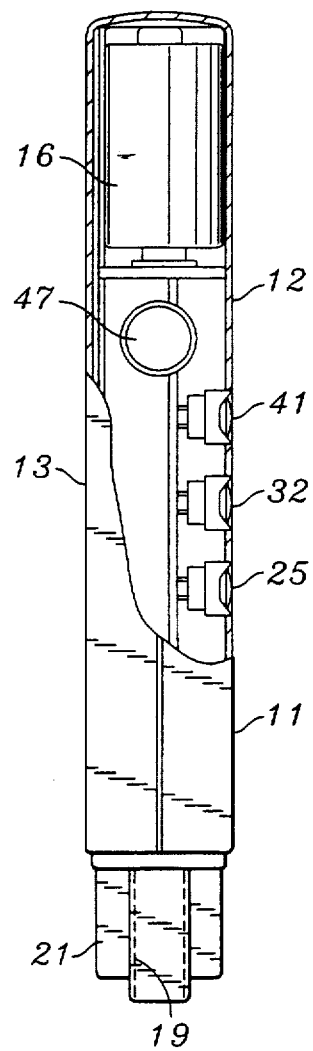
FIG. 1
FIG. 2
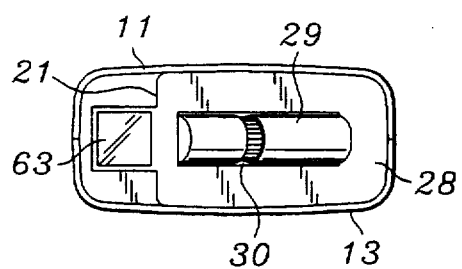
FIG. 3

PORTABLE OPTICAL SCANNER WITH INTEGRAL AUDIO RECORDER

FIELD OF THE INVENTION

The present invention relates generally to optical scanning devices and more particularly to a portable optical scanner having an integral audio recorder for selectively scanning lines of text and simultaneously recording voice comments regarding the scanned text.

BACKGROUND OF THE INVENTION

Optical scanners for scanning or inputing text or other data into an electronic memory from which it may later be retrieved are well known. Such optical scanners may be conveniently classified into two categories: table top and hand-held. Table top optical scanners are typically utilized to scan one or more entire pages. Hand-held scanners, on the other hand, are typically utilized to scan lines or selected portions of a page. Such hand-held scanners provide the advantages of portability and ease of scanning textual matter not printed upon paper. For example, identification numbers printed directly upon products may easily be input via such hand-held scanners.

One example of such a hand-held scanner is disclosed in U.S. Pat. No. 4,947,261 issued to Ishikawa, et al. on Aug. 7, 1990. Ishikawa discloses a portable input device having a light source for reading a document, a photoelectric converting element for converting reflected light from the document into an electrical signal, a solid state memory section for storing the output of a photoelectric element, and an output port for allowing external connections whereby the contents of the solid state memory may be transmitted to an external appliance. A diffraction grating focuses an image of the document upon the photoelectric converting element. Interchangeable lenses having different focal lengths provide various magnifications.

An inherent disadvantage of the Ishikawa device is that it must be oriented substantially perpendicular to the surface upon which scanning is being performed. Such perpendicular orientation of the device is substantially awkward and difficult to maintain over extended periods of time. Fatigue is typically experienced after extended use. Tilting of the Ishikawa device inherently results in loss of focus of the image formed upon at least a portion of the photoelectric converting element.

Further disadvantages commonly associated with such portable scanners in general is the inability to conveniently annotate or provide verbal comments associated with the text or other matter being scanned. For example, it is commonly desired to scan a portion of text, from a book, and then provide associated comments such as the title of the document being scanned. Such comments are typically recorded in contemporary practice by either writing them upon a notepad or verbally recording them utilizing a separate microcassette recorder or the like. Use of such written and separately recorded annotations involves the inherent disadvantage that annotations are not directly linked to the scanned matter. As such, it may be difficult at a later time to properly associate the annotations with the scanned text. That is, the user may become confused as to which annotations are associated with particular scanned text. Additionally, the comments can easily become physically separated from the scanned material and lost.

In view of the shortcomings of the prior art, it is desirable to provide a hand-held, portable optical scanner having an integral audio recorder which is held at a comfortable angle during the scanning process to mitigate fatigue and to improve the reliability of the scanning and annotating processes.

SUMMARY OF THE INVENTION

The present invention specifically addresses and alleviates the above-mentioned deficiencies associated in the prior art. More particularly, the present invention comprises a portable optical scanner having a hand-held housing containing an optical sensor, a first memory for storing information representative of the output of the optical sensor, and a fiber optic image guide extending from the lower end of the housing to a position proximate the optical sensor for communicating an image being scanned from a scanned surface to the optical sensor. A lens disposed intermediate the optical sensor and image guide focuses the image upon the optical sensor.

The fiber optic image guide has a lower surface formed at an angle of approximately 65 degrees to the longitudinal axis thereof such that the portable optical scanner is held at a conveniently comfortable angle during the scanning process to mitigate fatigue and improve the reliability of the scanning process.

A microphone and second memory for storing information representative of the output of the microphone facilitates the recording of voice comments or annotations to the image being scanned. Both the scanned data and the voice annotations are downloadable from the portable optical scanner with integral audio recorder of the present invention to an external display or storage device such as a personal computer, printer, CRT, etc. If downloaded to a computer, optical character recognition (OCR) can be performed to facilitate data manipulation, i.e. editing, data basing, etc.

A display in communication with the optical sensor displays the image being scanned to facilitate proper positioning of the fiber optic image guide during the scanning process. A standby switch and associated circuit permits the optical sensor to be operated in a low power consumption mode when the scanner is turned on but the fiber optic image guide is not in contact with a surface to be scanned. A scan window is adjustable in size to facilitate scanning of various type sizes. The quantity of memory allocated for scanning is proportional to the size of the scan window to optimize memory usage.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a front-view, partially in section, of the portable optical scanner with integral audio recorder of the present invention;

FIG. 2 is a side-view of the portable optical scanner with integral audio recorder of FIG. 1; and FIG. 3 is a bottom view of the portable optical scanner with integral audio recorder of FIGS. 1 and 2.

DETAILED DESCRIPTION OF THE PREFERRED EMBODIMENT

The detailed description set forth in below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The portable optical scanner with integral audio recorder of the present invention is illustrated in FIGS. 1 through 3 which depict a presently preferred embodiment of the invention. Referring now to FIGS. 1 through 3, the portable optical scanner with integral audio recorder is comprised generally of a front case cover 11 attached, preferably removably, to a back case cover 13, defining a housing 12 within which an optical sensor 15, preferably a charge coupled device (CCD), lens 17, and a fiber optic image guide 19 are disposed.

The optical image guide 19 extends downward to the bottom of the housing 12 defined by the front 11 and back 13 case covers. The lowermost surface 63 of the fiber optic image guide 19, i.e., the end which contacts the surface being scanned, is formed at an angle, preferably approximately 65 degrees to the longitudinal axis of the optical image guide 19 such that the portable optical scanner with integral audio recorder is held at a comfortable and convenient angle during use to mitigate fatigue and insure reliable operation.

The lens 17 disposed intermediate the uppermost end of the fiber optic image guide 19 focuses the image transmitted through the fiber optic image guide 19 onto the image sensor 15. The fiber optic image guide 19, lens 17, and image sensor 15 are preferably mounted upon a longitudinally slidable, downwardly spring-biased angled carrier 21, which forms a portion of the housing 12. The carrier 21 slides a short distance, preferably approximately 2 mm, into the housing 12, thus accommodating slight movements of the user's hand during the scanning process and also facilitating the actuation of microswitch 22 mounted on the housing 12.

The activation of microswitch 23 causes the optical sensor 15 to leave standby, i.e., lower power consumption, mode and enter the operational mode during which scanning actually occurs. In order to conserve power in the portable optical scanner with integral audio recorder of the present invention, turning the device on with power switch 25 merely causes the optical sensor 15 to be placed in the standby mode. The image sensor 15 is thus only fully powered up or placed in the operational mode when the device is actually in contact with a surface to be scanned such that the microswitch 23 is actuated. At least one LED 43 provides illumination of the image to be scanned. Like the image sensor 15, the LED's are only activated during the scanning process in response to the actuation of microswitch 23. A spring-biased plunger 27 is attached to and moves with the slide member 21 to effect actuation of the microswitch 23 when the slide member 21 is forced into the housing 12 during the scanning process.

Roller 29 is mounted at the lowermost edge of angled slide member 21 such that roller 29 contacts the surface being scanned during the scanning process, thus both causing the portable optical scanner to track in a straight line and effecting rotation of the encoder gear train 31. The roller 29 is mounted to the angled slide 21 via the spring loaded bushings 65 which accommodate a small degree of upward movement of the roller 29 into the angled slide 21. The gear train 31 is connected to the roller 29 via teeth 30 formed thereupon. The encoder gear train 31 causes the encoder 22, preferably a photo encoder switch, to sense rotation of the roller 29. Thus, movement of the portable optical scanner during the scanning process is scanned to provide an indication of the relative position of the device which is required during the scanning process. Those skilled in the art will recognize the need for which relative position information in the scanning process and the means by which such information is utilized.

Slide control 33 moves a shutter (not shown) which selectively obscures a portion of the fiber optic image guide 19, at either the input or output end thereof, to control the size of the image being scanned. The slide control also affects memory allocation during the scanning process. Memory is allocated in proportion to the size of the window or opening at the fiber optic image guide 19, thus optimizing memory usage during the scanning process. That is, a larger fiber optic image guide window opening, corresponding to scanning of larger type sizes or images and requiring greater memory for a given resolution, results in proportionally greater memory allocation.

Rechargeable batteries 16 provide power for the operation of the optical sensor 15 and associated electronics 35. The batteries 16 are preferably rechargeable and have a dedicated charging circuit within the housing 12. Alternately, the batteries may be nonchargeable and replaced when exhausted. The batteries may be accessed by opening battery cover 62 formed in the housing 12.

A memory switch 37 causes the amount, preferably expressed as a percentage, of free memory to be displayed in LCD display window 39. Momentary actuation of a clear switch 41 causes the last item scanned to be erased from memory. Longer actuation of the clear switch 41, preferably for at least two seconds, effects erasure of the entire memory, i.e., all scanning operations contained therein.

Microphone 47, and associated circuitry and memory formed upon circuit board 35 facilitate the recording of voice annotations during the scanning process. The voice recording circuitry is preferably enabled when the power switch 25 is placed in the opposition such that voice annotating can occur irrespective of actuation of the microswitch 23, thus allowing voice annotation before, during and after the actual scanning process.

Audio enunciator or buzzer 53 signals the user of any change of status of the portable optical scanner with integral audio recorder of the present invention. For example, any time the position of the clear 41, memory 32, or power 25 switch is changed. The enunciator 53 preferably also provides an indication of low battery power and/or low remaining memory capacity. Low battery indicator 55, preferably an LED provides a visual indication of battery charge status. A similar LED (not shown) may likewise provide an indication of remaining or available memory. Power on indicator 57, preferably an LED, provides a visual indication that the device is either in the standby or operate mode (depending upon the status of microswitch 23).

PC connection port 59 facilitates interconnection of the portable optical scanner with integral audio recorder of the present invention with an external device, i.e., a personal computer, printer, CRT, etc. Thus, the image and/or voice data stored within the portable optical scanner with integral audio recorder can be downloaded for display and/or storage. A letter-size gauge 61 formed upon the bottom of the housing 12 provides a comparative reference for a visual indication of the type size being scanned to aid in the setting of letter size switch 33.

Having described the structure of the portable optical scanner with integral audio recorder of the present invention, it may be beneficial to describe the operation thereof. The device is placed in the ready or standby mode by positioning the power switch 25 in the on position. Battery status is checked by observing the battery low indicator 55. The amount of remaining or free memory available for use can be checked by actuating the memory switch. The amount of memory remaining for use is displayed in the LCD display 39. Either the last scanned image or the entire contents of the memory can be cleared by actuating the clear switch 41. Momentary actuation of the clear switch 41 results in clearing of the last scanned image. Actuation of the clear switch 41 for greater than two seconds results in clearing of the entire memory contents.

Prior to scanning an image, voice annotations can be recorded. Recording can be effected either via voice operated (VOX) actuation means or optionally a manual control may be provided. Scanning commences by positioning of the angled or lowermost surface 63 of the fiber optic image guide 19 over one end of the image to be scanned and drawing or moving the device in a straight line such that the lowermost portion 63 of the image guide 19 sweeps across the image to be scanned. The roller 29 helps maintain straight-line movement of the device. Voice annotation may continue during and after the scanning process.

Upon completion of the scanning process and/or upon an indication of full memory utilization, the contents of the memory may be transferred or downloaded to another device, i.e., a personal computer, printer, CRT, etc. via the connection port 59. The connection port 59 is preferably of the RS232 type. Recharging, when necessary, is accomplished by connecting a charger, similar to those commonly used to recharge portable appliances, i.e., recorders, shavers, etc., to the recharging receptacle.

It is understood that the exemplary portable optical scanner with integral audio recorder described herein and shown in the drawings represents only a presently preferred embodiment of the invention. Indeed, various modifications and additions may be made to such embodiment without departing from the spirit and scope of the invention. For example, various means other than an optical encoder and associated gear train may be utilized to sense position of the device during the scanning process. Also, various types of memory, i.e., RAM, tape, magnetic disk, optical disk, etc., may be utilized for the recording and storage of the image and/or voice data. Indeed, an external device may optionally be connected to the portable optical scanner with integral audio recorder of the present invention to facilitate such storage and/or to increase the capacity of the device. Thus, these and other modifications and additions may be obvious to those skilled in the art and may be implemented t adapt the present invention for use in a variety of different applications.

What is claimed is:

1. A portable optical scanner comprising:
    a) a hand-held housing;
    b) an optical sensor disposed within said housing;
    c) a first memory in electrical communication with said optical scanner for storing information representative of the output of said optical sensor;
    d) an image guide extending to a position proximate said optical sensor for communicating an image being scanned from the scanned surface to the optical sensor;
    e) a microphone; and
    f) a second memory for storing information representative of the output of said microphone.

2. The portable optical sensor as recited in claim 1 further comprising a lens disposed intermediate said optical sensor and said fiber optic image guide for focusing the image upon said optical sensor.

3. The portable optical sensor as recited in claim 1, wherein said first memory comprises a solid state electronic memory.

4. The portable optical scanner as recited in claim 1 wherein said second memory comprises a solid state electronic memory.

5. The portable optical scanner as recited in claim 1 further comprising a display in communication with said optical sensor for displaying an image being scanned.

6. The portable optical scanner as recited in claim 1 further comprising:
    a) a standby switch responsive to the optical scanner contacting a surface in a manner facilitating scanning; and
    b) a standby circuit for activating said optical sensor in response to said standby switch.

7. The portable optical scanner as recited in claim 1 further comprising a scan window, said scan window being adjustable in size to facilitate scanning of various type sizes.

8. The portable optical scanner as recited in claim 7 further comprising a circuit for varying a quantity of said first memory allotted for scanning such that the amount of first memory so allotted is directly proportional to the size of said scan window.

9. The portable optical scanner as recited in claim 1 wherein said image guide comprises a lower surface formed at an agle of approximately 65 degrees to the longitudinal axis of said image guide to facilitate manipulation of the portable optical scanner during use thereof.

* * * * *